United States Patent
Kleuderlein et al.

(10) Patent No.: US 9,803,531 B2
(45) Date of Patent: Oct. 31, 2017

(54) CATALYST MODULE, RECEIVING UNIT FOR SUCH A CATALYST MODULE AND METHOD FOR MANUFACTURING SUCH A CATALYST MODULE

(71) Applicant: Johnson Matthey Catalysts (Germany) GmbH, Redwitz (DE)

(72) Inventors: Robert Kleuderlein, Altenkunstadt (DE); Udo Klumpp, Marktgraitz (DE)

(73) Assignee: Johnson Matthey Catalysts (Germany) GMBH, Redwitz (DE)

( * ) Notice: Subject to any disclaimer, the term of this patent is extended or adjusted under 35 U.S.C. 154(b) by 55 days.

(21) Appl. No.: 14/633,298

(22) Filed: Feb. 27, 2015

(65) Prior Publication Data
US 2015/0240691 A1 Aug. 27, 2015

(51) Int. Cl.
*F01N 3/28* (2006.01)
*F16M 1/08* (2006.01)
(Continued)

(52) U.S. Cl.
CPC .......... *F01N 3/2839* (2013.01); *B01D 53/88* (2013.01); *B01J 35/0006* (2013.01); *B01J 35/04* (2013.01); *F01N 3/28* (2013.01); *F01N 3/2803* (2013.01); *F01N 3/2814* (2013.01); *F01N 3/2842* (2013.01); *F01N 13/017* (2014.06);
(Continued)

(58) Field of Classification Search
CPC ........ F01N 3/2839; F01N 3/28; F01N 13/017; F01N 3/2803; F01N 13/1855; F01N 3/2842; F01N 3/2814; F01N 13/185; F01N 2350/00; F01N 2590/02; F01N 2590/10; F01N 2450/30; B01J 35/0006; B01J 35/04; F23J 15/02; F23J 2219/10; B01D 53/88; B01D 2258/012; B01D 2259/455; B01D 2258/0283; F16M 1/08; Y10T 29/04; Y10T 29/49345
See application file for complete search history.

(56) References Cited

U.S. PATENT DOCUMENTS 1,426,196 A * 8/1922 Jordahl .................. B01D 46/12
55/483
3,487,625 A * 1/1970 Lucas .................... B01D 46/10
264/252
(Continued)

FOREIGN PATENT DOCUMENTS

JP S5484868 A 7/1979
JP 58024323 2/1983
(Continued)

*Primary Examiner* — Korie H Chan (57) ABSTRACT

The catalyst module is designed for use in an emission control system of an industrial scale combustion system. It comprises a stack frame, in which several mounting units, especially element boxes are inserted. Each of these is provided with several catalysts. In order to make a simple installation possible and, at the same time, a reliable sealing, the stack frame is assembled from side frame parts, which are connected and especially bolted to one another via mechanical connecting elements, a sealing element, which is inserted during the installation before the connection of the at least one side frame part and pressed against at least one element box with the help of the connecting element, being present at least at a side frame part.

11 Claims, 4 Drawing Sheets

(51) Int. Cl.
*B01D 53/88* (2006.01)
*B01J 35/04* (2006.01)
*F01N 13/18* (2010.01)
*F01N 13/00* (2010.01)
*F23J 15/02* (2006.01)
*B01J 35/00* (2006.01)

(52) U.S. Cl.
CPC ....... *F01N 13/185* (2013.01); *F01N 13/1855* (2013.01); *F16M 1/08* (2013.01); *F23J 15/02* (2013.01); *B01D 2258/012* (2013.01); *B01D 2258/0283* (2013.01); *B01D 2259/455* (2013.01); *F01N 2350/00* (2013.01); *F01N 2450/30* (2013.01); *F01N 2590/02* (2013.01); *F01N 2590/10* (2013.01); *F23J 2219/10* (2013.01); *Y10T 29/49345* (2015.01)

(56) References Cited

U.S. PATENT DOCUMENTS

| | | | | |
|---|---|---|---|---|
| 4,238,455 A | * | 12/1980 | Ogiwara | B01D 53/8631 422/171 |
| 4,324,701 A | * | 4/1982 | Honda | B01J 35/04 422/180 |
| 4,618,068 A | * | 10/1986 | Born | B65D 88/528 220/1.5 |
| 4,814,146 A | * | 3/1989 | Brand | B01J 33/00 422/171 |
| 4,849,185 A | * | 7/1989 | Wittig | B01D 53/86 34/242 |
| 4,916,001 A | * | 4/1990 | Whittenberger | B01D 53/8631 428/116 |
| 5,228,892 A | * | 7/1993 | Akitsu | F01N 3/0222 55/302 |
| 5,512,074 A | * | 4/1996 | Hanni | B01D 46/0005 55/484 |
| 5,809,645 A | | 9/1998 | Thomsen et al. | |
| 6,609,336 B2 | * | 8/2003 | Matsubara | E04B 1/02 446/115 |
| 2004/0009874 A1 | | 1/2004 | Koike et al. | |
| 2013/0327256 A1 | * | 12/2013 | Glenn, II | A47B 13/00 108/50.02 |
| 2015/0108880 A1 | * | 4/2015 | Chung | A47B 87/0292 312/108 |

FOREIGN PATENT DOCUMENTS

| | | |
|---|---|---|
| JP | 62121638 | 11/1985 |
| JP | 62191026 | 8/1987 |
| JP | 62191026 A | 8/1987 |
| JP | 06015138 | 1/1994 |
| JP | 07019036 A | 1/1995 |

\* cited by examiner

CATALYST MODULE, RECEIVING UNIT FOR SUCH A CATALYST MODULE AND METHOD FOR MANUFACTURING SUCH A CATALYST MODULE

CROSS-REFERENCE TO RELATED APPLICATIONS

This application claims priority to German Patent Application No. DE 10 2014 203 618.6, filed on Feb. 27, 2014, and is incorporated herein by reference.

SPECIFICATION

The invention relates to a catalyst module for use in an emission control system of a stationary combustion system, a mounting unit for such a catalyst module and a method for producing such a catalyst module.

A stationary combustion system is understood to be any system for the combustion of hydrocarbon-based fuels. They are, for example, coal-fired or oil-fired (petroleum) systems or gas turbines. Stationary combustion systems also comprise marine applications, for example combustion systems such as diesel engines, as used for large container or cruise ships. The stationary combustion systems are usually operated continuously under a constant, stationary load.

Stationary combustion systems usually have an emission control system, which is provided with catalyst modules. Moreover, the catalyst modules are installed in a flue gas duct of the emission control system and the flue gas, which is to be purified, flows through them during operation. In this connection, the flue gas duct typically has a cross-sectional area of at least several square meters and typically also of several times ten square meters. Frequently, the flue gas duct has a rectangular cross-section with an edge length in each case of several meters, for example, of 10 m×10 m. The whole cross-sectional area of the flue gas duct is covered by one or also several catalyst modules, which are arranged next to one another, so that all the flue gas, which is to be purified, flows through the catalyst modules. Usually, several catalyst modules, for example, two to five, are disposed next to one another in rows and columns in a supporting framework within the flue gas duct. The catalyst modules themselves typically have a rectangular cross-section with an edge length of, in each case, several meters.

Moreover, in the direction of flow of the flue gas, the catalyst modules frequently are disposed in several planes one behind the other. In the direction of flow, a catalyst installation, built up from catalyst modules, also extends for several meters, especially for several times ten of meters, such as for 25 m.

The catalyst modules are built up from a stacking frame, in which several mounting units are inserted, which, in turn, are provided with several catalysts. Moreover, the flue gas flows through the individual catalysts in the direction of flow. These catalysts are, for example, plate catalysts. However, in the present case of interest, they are so-called honeycomb catalysts. These honeycomb catalysts are monolithic components of a ceramic material, which is permeated by a plurality of flow channels in the direction of flow. In the installed, operating state, flue gas, which is to be purified, flows through the flow channels. This monolithic structure has a catalytic activity with respect to purifying the flue gas. Alternatively, the monolithic carrier is provided with a catalytic coating or the carrier material itself is catalytically active. In particular, these honeycomb catalysts are extruded honeycomb catalysts. A catalyst typically has a rectangular and, in particular, a square cross-sectional surface with an edge length of about 10 cm to 30 cm.

In a first variation, the mounting units are so-called element boxes, in which the individual catalysts are arranged in matrix fashion, adjoining one another. At the same time, sealing elements, which usually are in the form of a nonwoven fabric and are to prevent leakage flow through the boundary plane between adjacent catalysts or between the catalysts and the element boxes, are preferably disposed between the individual catalysts. Typically moreover, two to ten catalysts with, in each case, a rectangular and, in particular, a square cross-sectional surface, are disposed usually in several layers over or next to one another in a respective element box.

The element boxes themselves are disposed within the stack frame also in matrix fashion. The number of element boxes depends on the size of the catalyst module. The element boxes are usually constructed from sheet-metal parts, which, for reinforcing purposes, have edges, which are folded over about 90° at opposite sides. In operation, these are therefore oriented perpendicularly to the direction of flow of the flue gas, which is to be purified, and, with that, form surfaces, which undesirably resist flow.

Aside from the element boxes, which typically are disposed in several rows in a stack frame, the mounting units of a second variation are constructed as so-called packing and storage units, which, in each case, are also provided with catalysts; in comparison to element boxes, they are larger and are typically arranged only in a single row within a catalyst module. Usually, sealing and compensating elements of a nonwoven fabric are in turn disposed between the catalysts.

In the emission control system, the catalyst modules are fastened to one another with the help of the stack frame. The catalyst modules are prefabricated as construction units, usually, for example, by the manufacturer of the catalysts, and installed as such. During the operation, the catalyst modules must withstand mechanical as well as thermal loads. The temperature of the flue gas in such stationary installations typically ranges from, for example, 400° to 500°. With regard to as effective a purification of the flue gas as possible, leakage flows should be avoided so that the whole of the flue gas passes by the catalytically active surfaces. With regard to the minimization of flow pressure losses, it is also desirable to utilize the largest possible proportion of the cross-sectional area of the flue gas duct.

The stack frame of the prior art is a welded steel profile, in which the individual mounting units, that is, for example, the element boxes or also the packing and storage units, are inserted. In order to achieve secure mechanical fastening, the element boxes are each welded to the stack frame as well as to one another. In order to be able to equip the stack frame, the latter is overdimensioned to some degree. The remaining gap is sealed with a strip-shaped sealing element. However, the problem exists here that, because of different thermal coefficients of expansion, this strip-shaped sealing element may become detached in operation, so that leakage flows result. This problem affects also the sealing and equalization elements inserted between the individual catalysts. Overall, the danger therefore exists in the case of conventional units that, in the course of the operating time, leakage flows will result.

Arrangements with packing and storage units, in which, for example, in each case three such units per catalyst module are strung together, are welded together and to the stack frame these days in a costly pressing and welding device, which is especially manufactured for this purpose.

For providing it with catalysts, a packing and storage unit initially is inserted in an open frame of the unit, after which the packing and storage units are braced against one another by pressing on a lid. Subsequently, the lid is welded to the side parts of the packing and storage unit. These packing and storage units are then, in turn, placed in the stack frame, to which they are welded. Here also, it is necessary once again to seal. Because of this complex manufacturing process, an expensive welding device is required and typically also matched to the size of the respective catalyst module. As a result, the total manufacturing costs are comparatively high.

Starting out from the above, it is an object of the invention to enable a simplified production of such a catalyst module, which, in particular, has at the same time continuously good flow properties and an improved cleaning efficiency because of less leakage.

The objective is accomplished in accordance with the invention by a catalyst module for use in an emission control system of an industrial scale combustion system. The catalyst module is therefore designed and conceived for such previously described emission control systems of stationary combustion systems, especially of power plants for generating energy. Reference is made to the previous versions with respect to the basic arrangement as well as with respect to the basic construction and the size relationships of such catalyst modules.

The catalyst module comprises a stack frame with a base part and a lid part as well as two side parts. The stack frame extends in a longitudinal as well as in a transverse direction and has two opposite end surfaces in a flow direction, which end surfaces are bordered by the base part, the lid part and the two side parts. The end surfaces are braced in the longitudinal direction and the transverse direction and are oriented perpendicularly to the direction of flow of a flue gas, when they are installed in a flue gas duct of the emission control system. At least one, preferably several mounting units, which each have a peripheral side wall and each are open in the direction of the end face, are inserted in this stack frame. Each of these mounting units is provided with several catalysts, especially with honeycomb catalysts.

The catalysts are preferably monolithic honeycomb catalysts comprising a ceramic carrier material which is penetrated by a multiplicity of individual flow ducts. Here, the carrier material is optionally coated with a catalytically active layer or is itself catalytically active. A catalyst is generally understood to be a unit with a catalytic activity for the desired purification of the flue gas. Aside from (extruded) honeycomb catalysts, plate catalysts may, for example, also be used. The catalysts in a catalyst module are preferably but not necessarily of identical configuration to one another. Here, a plurality of catalyst part units, that is to say, for example, a plurality of monolithic honeycomb bodies, can also be inserted one after another in the direction of flow. These part units which are lined up in a row in the direction of flow then form one catalyst. If required, the part units are of different configuration with regard to their catalytic action. They are preferably of identical configuration.

The stack frame furthermore has a peripheral wall, which is composed of individual side frame parts, which are connected and especially bolted to one another by at least one, preferably several mechanical connecting elements. Preferably, the side frame parts are not welded together. Preferably, they are therefore connected exclusively by mechanical connecting elements, especially by bolts. Furthermore, at least one sealing element is pressed between at least one side frame part and an adjoining mounting unit and, moreover, because of a bracing of the one side frame part, during the installation thereof with bolts. During the manufacture, the at least one sealing element is therefore initially placed on one of the mounting units at the edge, before the adjoining side frame part is bolted to the further side frame parts. The sealing element is pressed here between the side frame part and the at least one mounting part with the help of the mechanical connecting element. At the same time, the pressing force is applied by the mechanical connecting element. All the mounting units are clamped into the stack frame by these means.

The mechanical connecting elements preferably are bolting elements, such as bolts with the nuts, threaded bolts, etc.

The special advantage is achieved by such a procedure that, by the bolting of the side frame parts, the sealing element is firmly pressed between at least one side frame part and the at least one mounting unit and thus compressed because of its elastic properties. As a result, variations in the distance between the side frame parts and the mounting units are equalized even if the thermal expansion of the individual components is different. If there is a change in temperature, for example, between the installation and the operation or also when the combustion system is started up, the sealing element is prevented by these means from falling out and, with that, the occurrence of leakage flows is avoided reliably.

"Elastic sealing element" is first of all generally to be understood to be any element which exhibits an elasticity and ensures a sealing action in the long term between the respective mounting unit and the respective side frame part, even at the high operating temperatures of several hundred degrees Celsius and, in particular, even in the case of temperature changes, for example while running the system up or down. Here, "elastic" is generally understood to mean that a deformation of the sealing element, for example a change in the thickness of more than 10%, for example of from 10% to 30%, is possible while retaining an (elastic) restoring force, with the result that the fitting element is held preferably but not necessarily held between the wall of the mounting shaft and the side frame part solely by way of the elastic restoring force. In principle, sealing elements can also be inserted between each of the mounting units and a side frame part.

Due to the bolted arrangement, there is, at the same time, no need for a pressing and welding facility. By these means, the individual catalyst modules can therefore be adapted without problems, for example, with regard to their size, flexibly to the respective application i.e. the concrete installation situation in a plant. With that, the total manufacturing costs are kept low. Due to the arrangement with the bolting of the side frame parts, assembling directly at the building site is also simplified. Until now, the catalyst modules were prefabricated at a production site and moved as prefabricated units to the building site or the place of use. During this transport, special measures are also required in order to prevent sealing elements falling out or also other damage occurring to the individual ceramic catalysts, which usually are fragile.

With regard to manufacturing the stack frame as simply and as cost effectively as possible, the side frame parts thereof preferably are formed at least partly from sheet metal parts, which have been bent over. For forming the side frame parts, U-shaped profiles, for example, are preferably formed from initially flat metal sheets by bending edge parts and are formed by a further metal sheet element into a closed polygon. By these means, a sufficiently high stability is achieved with a comparatively low use of material. In combination with the arrangement that can be bolted, this also leads to the fact that the individual side frame parts can be transported in a space-saving manner as individual elements. In this connection, the respective side frame part is formed by an elongated, flat element.

Expediently, the side frame parts are constructed in each case as a hollow profile of two sheet metal parts, which are connected with one another. At least one of these sheet-metal parts is bent over and forms, for example, a U-shaped profile, on which then the second sheet-metal part is placed as if it were a lid. To connect them, these two sheet-metal parts interlock positively with one another in particular via brackets and slots, so that a high mechanical stability is attained.

In a preferred arrangement, at least some and preferably all of the side frame parts have retaining brackets, between which a respective mounting unit is held positively in the direction of flow. By these means, the mounting units are additionally secured mechanically within the side frame part. Expediently, welding of the mounting units to the side frame parts is foregone and these units are exclusively held positively by the holding brackets. The mounting units are therefore fixed in the direction of flow by the holding brackets. The holding brackets are preferably arranged on both sides of the mounting units as viewed in the direction of flow.

Expediently, one of the side frame parts is constructed as a lid part and, externally, has at least one sealing web, which is disposed at the edge and preferably is formed by bending over the side frame part. The function of the sealing web is to close off a parting plane between two adjacent catalysts modules in the installed state. Preferably, the lid part as a whole is bent over in a U-shaped manner, so that such a sealing web is formed as a fold on either side of the longitudinal edges of the lid part. An adjacent catalyst module with a base element is accommodated between these sealing webs as viewed in the direction of flow.

Preferably, the mounting units are so-called element boxes, which were described above. In this respect, reference is made to the introductory embodiments of the basic construction as well as the basic arrangement of such element boxes within the stack frame. Several element boxes, forming an n×m matrix and adjoining one another, are inserted in several rows and columns within the stack frame. The element boxes are therefore disposed in n rows above one another and in m columns next to one another. Each of the element boxes has a free interior space, in which at least one catalyst, but preferably several catalysts, adjacent to one another, are inserted. In this connection, a free interior space is understood to mean that the element boxes do not have any additional internal partitions. The element boxes are therefore formed by peripheral side walls and are open towards the opposite end faces of the stack frame. The wall consists especially of one or several metal sheets, which are connected with one another. Usually, sealing elements are inserted between the catalysts.

A further advantage is to be seen therein that the individual catalysts are exposed now only to lower pressing forces during the assembly of the stack frame. In comparison to previous solutions, the catalysts need therefore only be formed now with a lesser mechanical stiffness. This has a favorable effect on the flow properties of the catalyst, especially the honeycomb catalyst, so that an improved cleaning efficiency is also achieved by these means.

The use of the sealing elements at the same time also provides a means which insulates the catalyst against forces which are caused by temperature changes during heating up and contact with the walls which surround it, or against vibrations or jolts which can occur during normal operation and act on the catalyst. This makes it possible to use catalysts which are weaker in terms of their structure than those currently in use. At the same time, advantages such as reduced back-pressure, etc. are associated with this, since, on account of the insulating properties, they certainly do not have to have the strength exhibited by conventional catalysts.

In an appropriate arrangement, the element boxes are held together positively by means of plug-in connections, especially without being fastened further by welding. The element boxes therefore have complementary plug-in connection elements, with the result that they are held by being simply plugged in or on. Therefore, a largely or completely weld-free assembly of the catalyst module is supported by this special arrangement of the element boxes as components which can be plugged into one another. The individual element boxes are held together positively and therefore fixed to one another only by the plug-in connections. Especially in conjunction with the boltable stack frame, the resulting assembly is simple. In particular, the stack frame is assembled only partly initially, in particular the base part is initially only constructed with one or both side frame parts, so that an open L- or U-shaped stack frame is formed which is then provided successively with the element boxes, before it is then closed by the lid part.

At the side walls, there is at least one plug-in element and one plug-in opening for forming the plug-in connections. These are formed, especially as a plug-in bracket, which preferably is bent, and as a plug-in slot.

In an expedient further development, the element boxes are held positively not only to one another but also to the stack frame and, in particular, without being fastened further by welding. For this purpose, for example, a plug-in bracket engages in a corresponding mounting in the stack frame, which, preferably, has appropriate mountings in its side frame parts. Alternatively or in addition, the element boxes are held by the already mentioned bent holding brackets at the respective side frame part.

Overall, due to this concept, a weld-free construction of the individual element boxes within the stack frame in the form of a clip-in or plug-in system is attained, by means of which the manufacturing costs as a whole are kept low.

This basic concept of element boxes, which are connected positively with one another in the form of a clip-in or plug-in system, basically is possible also independently of the bolted arrangement of the stack frame with the pressed-in sealing element and is regarded as an independent, inventive concept. The right to submit divisional applications for this is retained.

With regard to an improved throughflow of the individual catalysts, the edges of the side walls of the element boxes have a bent-over region, which is oriented at an angle to the direction of flow, at one end face in such a manner, that the bent-over region rises from the outer boundary of the element box inwards towards the catalyst. These bent-over regions are preferably configured on the inflow side and, in particular, on both end faces which lie opposite one another. An advantageous guidance of the flow, without dammed areas, is achieved by these means, as is the case with known element boxes, in which 90° bent-over portions are usually configured on the end faces. This is advantageous particularly on the end face, which forms an inlet side for the flue gas. This is advantageous also on the opposite end face, which forms an outflow side, with regard to a largely turbulent-free flow.

Preferably, a vertical section adjoins the bent-over area and is oriented at an angle to the latter. A respective end edge is therefore bent over at least twice at least in regions. The mechanical stiffness is increased by these means. In addition, in a preferred arrangement, the vertical section in at least a partial region is passed into or through the side wall. It is therefore supported, in particular, in the side wall, which likewise leads to improved rigidity. Preferably, the vertical section is passed through the side wall and protrudes over the latter, especially for forming the plug-in bracket. A plug-in bracket therefore is a continuation of the bent-over area.

The objective with respect to the mounting unit is furthermore accomplished according to the invention by a mounting unit which is formed as an element box with a free interior space, the element box forming, at its side walls, at least one plug-in element, especially a plug-in bracket, as well as a plug-in opening, especially a plug-in slot, so that adjoining element boxes are held together by plug-in brackets and plug-in slots in the form of a plug-in system.

Furthermore, the objective of the invention with respect to the method is accomplished by a method for producing a catalyst module in which, on the one hand, the mounting unit, especially an element box, is provided with the individual catalysts, especially the honeycomb catalysts. Initially, the stack frame is assembled only partly and the individual mounting units are inserted successively in this stack frame, which has been assembled only partly. Here, "partly assembled" is understood to mean that the stack frame is first of all open on at least one side, with the result that the mounting units can be inserted via this open side.

Especially a mat-shaped sealing element, particularly a non-woven mat, is then placed on the last layer of the mounting units. Subsequently, the stack frame is closed with compression of the sealing element. The sealing element is pressed here between a side frame part of the stack frame and at least one of the mounting units. Generally preferably, the sealing element rests with its entire surface on the mounting units.

The sealing element is substantially a flat, plate-shaped or strip-shaped and overall rectangular element which is configured in terms of area with a preferably rectangular basic area and is introduced between the mounting units and the respective side frame part.

Alternatively to the element boxes described here, the mounting units may also comprise differently configured mounting units. The use of the element boxes which are described here is not absolutely necessary.

Preferably, the stack frame initially is built up L-shaped and the sealing element is subsequently placed in L-shaped fashion on the outer layer of the mounting units, before the stack frame is closed with compression of the sealing element.

An example of the invention is explained in greater detail in the following by means of the Figures, in which.

In the Figures, identical components have been provided with identical reference numbers.

Figures 1, 2:
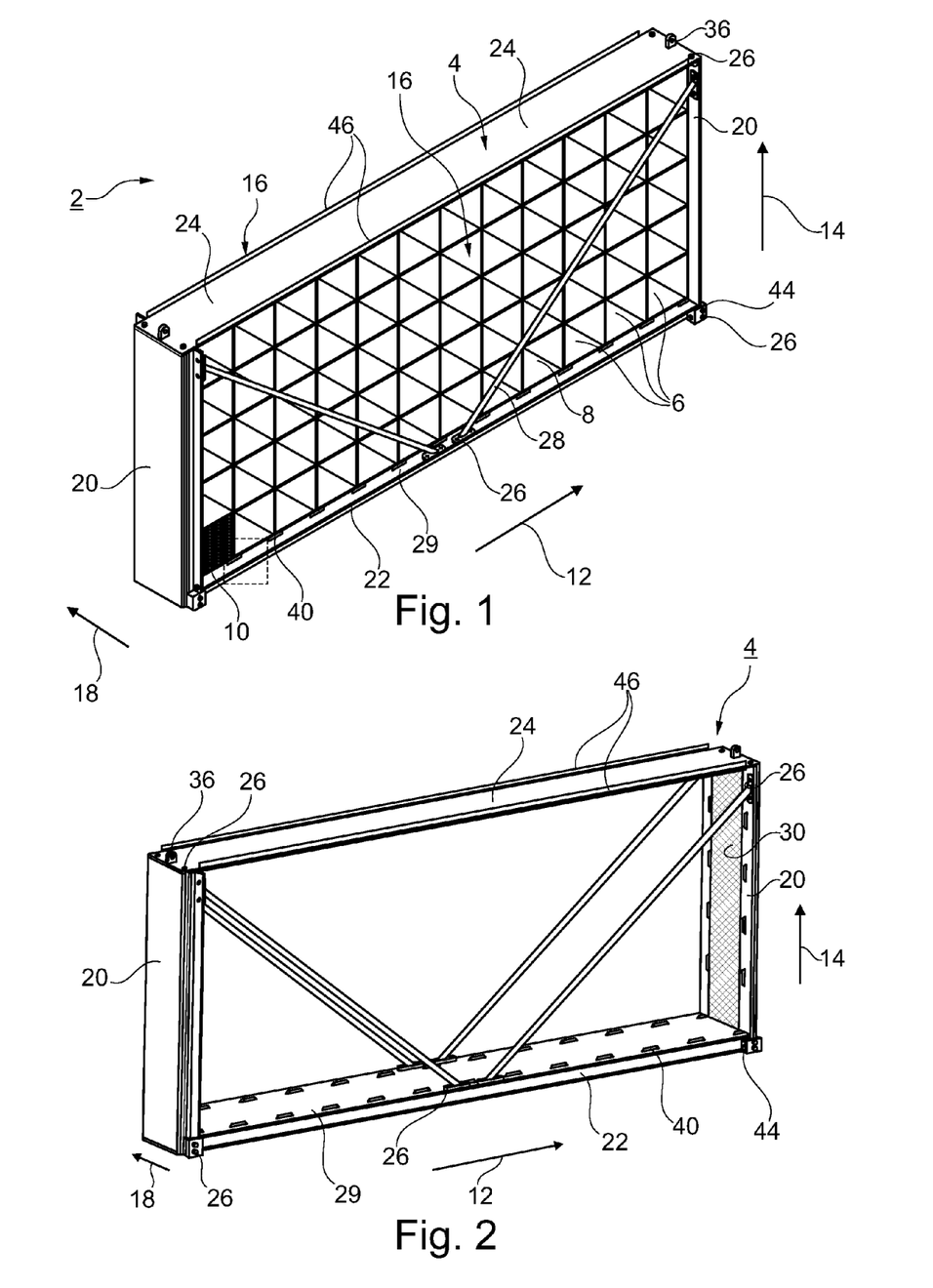
FIG. 1 shows a perspective representation of a partially equipped catalyst module.
FIG. 2 shows a perspective representation of an assembled stack frame.

The catalyst module 2, shown in FIG. 1, comprises a peripheral stack frame 4, in the interior space of which a plurality of accurately fitting element boxes 6 are inserted. The element boxes 6 form a lattice structure or matrix structure. Each element box 6 has an accommodation, which is formed by a free interior space 8 of the respective element box 6. Within the stack frame 4, several rows as well as several columns of element boxes 6 are usually disposed. The element boxes 6 form a 12×5 matrix in the example.

In each of the element boxes 6, there are several catalysts 10, which are preferably constructed as monolithic honeycomb catalysts and fill the interior space 8 completely. In FIG. 1, only one element box 6 is occupied by catalysts 10. As an alternative, only one catalyst 10 per element box 6 is used.

The whole of the catalyst module 2 extends in the longitudinal direction 12 as well as in the transverse direction 14 and has two opposite open end faces 16, which are at a distance from one another in a direction of flow 18 by the length of a catalyst 10. The end faces 16 form an inflow or inlet side as well as an outlet side for the flue gas, which is to be cleaned and which flows through the installed catalyst module 2 in the direction of flow 18.

The individual catalysts 10 are preferably extruded, rectangular honeycomb catalysts with a plurality of flow ducts extending in the direction of flow 18. The catalysts 10 preferably have a rectangular, especially a square cross-sectional and inflow surface, which has an edge length of 10 cm to 30 cm. In the example, four catalysts 10 are disposed in a 2×2 matrix in an element box 6. The element boxes 6 are therefore also formed square-shaped. Deviating from the square base shown, they may also be constructed with a rectangular base. Typically, the edge lengths of the element boxes may range from 0.4 m to 1 m. The length of the catalyst 10 in the direction of flow 18 typically ranges from a few 10 cm, for example from 15 cm to 60 cm. The width of the catalyst module in the direction of flow 18 corresponds at least approximately to the length of the catalysts 10.

The total length of the catalyst module 2 in the length direction 12 and also in the transverse direction 14 typically is in the area of a few meters. A plurality of catalyst modules 2 are usually in rows and columns in a flue gas duct with the aid of a supporting frame. A layer of this type of catalyst modules 2 extends in the longitudinal direction 12 and in the transverse direction 14, in each case for example over from 10 m to 20 m. Usually, several such layers, consisting of several catalyst modules 2, then follow in the flow direction 18.

The stack frame 4 has in total a peripheral wall consisting of four side frame parts, namely two side parts 20, a base part 22 as well as a lid part 24 (cf. FIG. 2). The four side frame parts 20, 22, 24 are connected with one another by means of bolted connections, for example, with the help of bolts 26 and, optionally, bolt nuts. For example, the bolt nuts are fixed, for example welded, to the side frame parts 20 and the bolts 26 are then screwed into the nuts. Alternatively, it is also possible to provide fixed threaded bolts, onto which the nuts are then placed. A welded connection between these parts is foregone. To increase the stiffness, the stack frame 4 has additional struts 28, which are also fastened at the edges by bolts 26 to the side parts 20 or to the base part 22 and there, preferably, in each case, to an edge part 29. Two struts 28, disposed approximately in the form of a V, are bolted to each end face 16.

In FIG. 2, a sealing element 30 is also shown at the right side part 20, which sealing element 30, in the Example, is formed, for example, from glass fibers as a mat-shaped nonwoven material. In the final, installed state, as shown in FIG. 1, this sealing element 30 (with the exception of the missing, complete placement of catalysts 10) is pressed between the outer layer of the element boxes 6 and the right side part 20 as well as the lid part 24. In this connection, a partial sealing element preferably is inserted once towards the side part 20 and once towards the lid part 24. The two partial sealing elements complement each other to form the sealing element 30. The sealing element 30 is thus also taken along the lid part 24 and, also at this longitudinal side, pressed between the outer layer of the element boxes 6 and the lid part 24. In particular, the sealing element 30 is a two-dimensional, strip-shaped element with a width, for example, of a few centimeters. Its width may also correspond at least approximately to the length of the element boxes 6 in the direction of flow 18. Its thickness lies, for example, in the region of one or a few centimeters. Sealing elements can likewise be inserted between adjacent element boxes 6.

Figure 3:
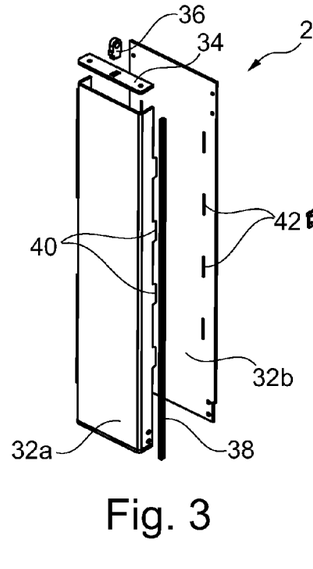
FIG. 3 shows a first side frame part of the stack frame in an exploded representation.
Figure 4:
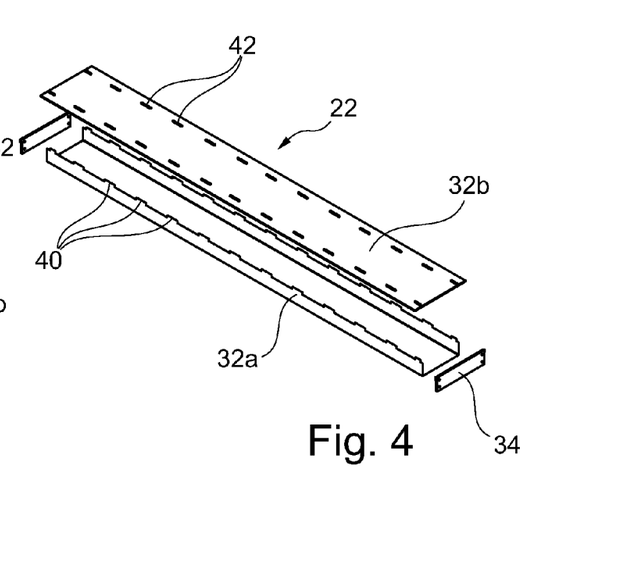
FIG. 4 shows a second side frame part, also in an exploded representation

In the example, the side parts 20 as well as the base part 22 are constructed as hollow profiles consisting of sheet-metal parts, which are connected to one another, as is shown in particular in FIGS. 3 and 4. The sheet-metal parts may be welded to one another. Both the side parts 40 and the base part 42 have a U-shaped part, preferably a sheet metal part 32a, and a planar part, preferably a sheet metal part 32b, which are connected to one another, for example by welding. At the sides, the hollow profile is closed off by covers 34 or end caps. In each case, a hook, in particular a loop 36 is fastened to the cover 34 of the side parts 20. The loop 36 is used, for example, for lifting or for handling the whole of the catalyst module 2, for example, with the help of a crane. Furthermore, at least one strip 38 is fastened and especially welded along the U-shaped sheet metal part 32a as a polygonal pipe in particular. This holds a sealing element, which is not shown here and which, in the installed state, seals the stack frame 4 to a supporting frame in the flue gas duct of the emission control system.

The sides of the U-shaped sheet metal part 32a are castellated at the ends and form protruding holding brackets 40. The holding brackets 40 are disposed in specified grid dimensions, which correspond especially to the width of an element box 6 in the longitudinal direction 12 or to a multiple hereof. As is evident particularly from FIG. 1, the holding brackets 40 are disposed so that they cover a joint between two adjacent element boxes 6. In the direction of flow 18, the holding brackets 40 are exactly opposite to one another and are spaced apart by the length of an element box 6, so that, in the flow direction 18, the latter is held between two holding brackets 40 assigned to one another.

Corresponding to the holding brackets 40, slots 42, through which the holding brackets 40 pass, are introduced, for example, by laser cutting also in the same grid dimensions in the flat sheet metal part 32b. The two sheet-metal parts 32a, b are therefore, as it were, interlocked with one another and, additionally, are preferably welded to one another. Additionally, holding elements 44, such as brackets or the like, may be disposed for fastening (by bolts) the individual side frame parts 20 to 24 to one another (for this purpose, compare FIGS. 1, 2). Alternatively or in addition, nuts, for example, are fixed at the side frame parts 20, especially at the side covers 34. The lid part 24 rests on the side frame parts 40.

The flat sheet-metal parts 32b protrude on both sides over the sides of the U-shaped sheet metal part 32a in the direction of flow 18 in each case by an edge strip. The struts 28, for example, are fastened to this edge strip.

In contrast to the side parts 20 and the base part 22, the lid part 24 is constructed as a simple, U-shaped, bent metal sheet, wherein the protruding sides are oriented towards the outside, that is, averted from the element boxes 6. These protruding sides form sealing webs 46. When several catalyst modules 2 are strung together in the transverse direction 14, the lid part 24 of the one catalyst module 2 accommodates the base part 22 of the adjacent catalyst module 2 between the two sealing webs 46, so that a parting plane between the two catalyst modules 2 is sealed.

The stack frame 4 is formed as a whole by steel components, especially two-dimensional sheet-metal parts, the individual components having a wall thickness, for example, of mm to 10 mm. The side walls 50 of the element boxes 6 are also formed from steel sheet with a wall thickness, for example, of between 3 mm and 10 mm.

Figure 5:
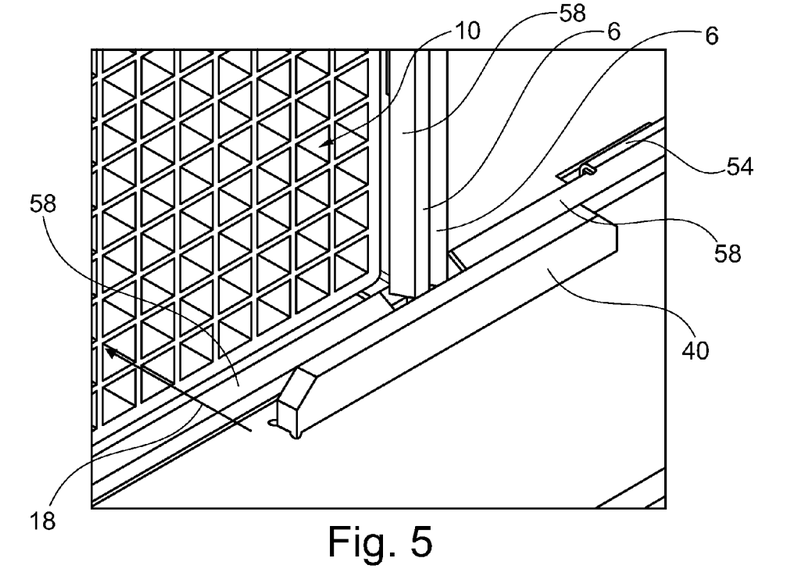
FIG. 5 shows an enlarged representation of the partial area of FIG. 1, which is marked with a rectangle.
Figure 6:
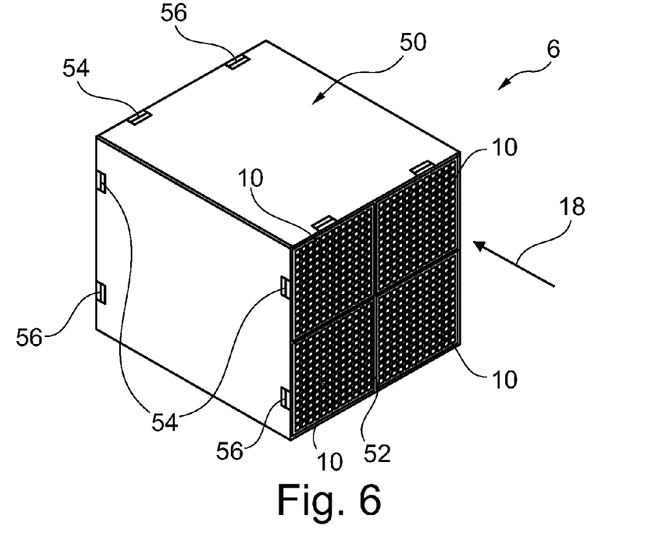
FIG. 6 shows a perspective view of an element box.
Figure 7:
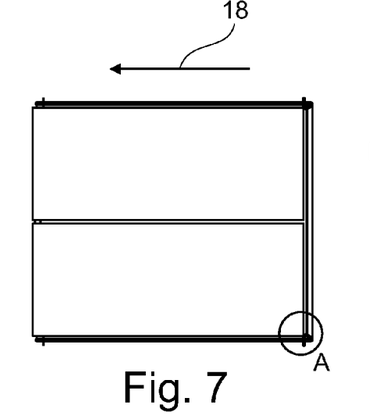
FIG. 7 shows an end face view of the element box of FIG. 6.
Figure 8:
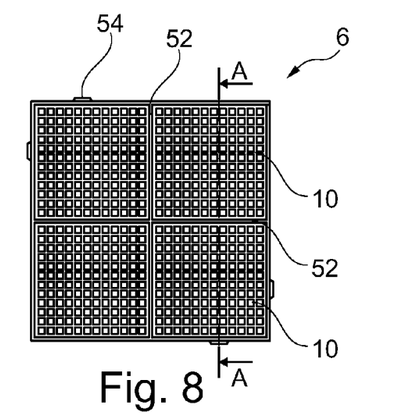
FIG. 8 shows a sectional view through the element boxes of FIG. 6 along the section A-A in FIG. 7.
Figure 9:
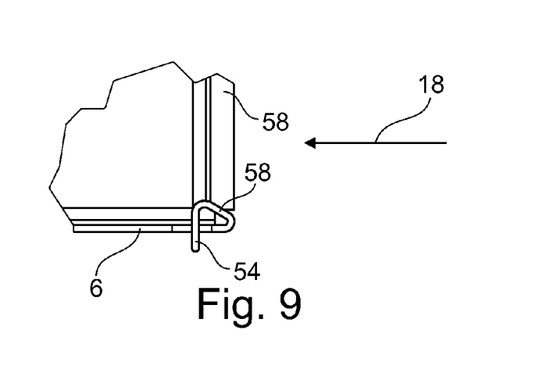
FIG. 9 shows an enlarged representation of the corner region, which is marked with a circle in FIG. 8
Figure 10:
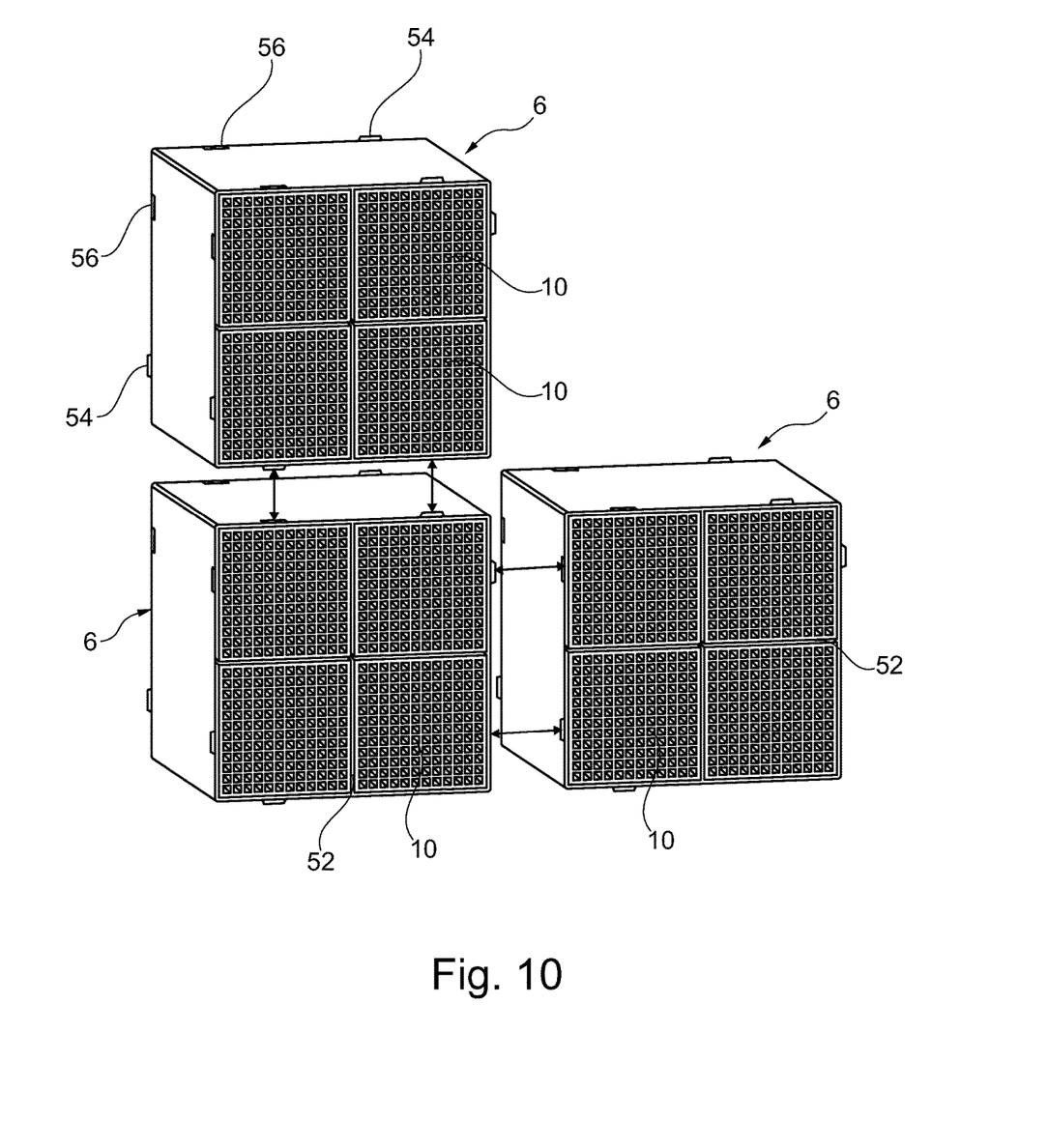
FIG. 10 shows a perspective representation of several element boxes to illustrate the assembly of the element boxes in the form of a plug-in system.

The construction of each element box 6 is evident especially from FIGS. 6 to 10, as well as, in addition, also from FIG. 5. The element box 6 has a peripheral side wall, which is formed by side walls 50 and forms the boundary of the free interior space 8. Additional partitions or struts or the like are not disposed within this free interior space 8. As shown particularly in FIGS. 6 and 8, the individual catalysts 10 adjoin one another in this free interior space 8. Sealing strips 52, are inserted between mutually adjacent catalysts 10. These therefore extend horizontally in the example as well as vertically and, overall, as somewhat cross-shaped. These, like the sealing elements 30, are mats of nonwoven material for example. Their function is to protect the individual catalysts 10 mechanically and to seal a gap between the catalysts 10 and, if necessary, between the catalysts 10 and the side walls 50. The sealing strips 52 and, preferably also, the sealing elements 30 consist in particular of a special nonwoven material, which has a coefficient of thermal expansion, which is comparable to that of the material (sheet-metal) of the element boxes 6. It consists of a nonwoven support material, into which a material with the desired coefficient of thermal expansion has been introduced. Such a material is, for example, a so-called vermiculite. Therefore, when there are temperature changes, for example, when the emission control system is started up, the sealing elements 30 exert a compressive force over the whole of the temperature range, so that they do not fall out of the element boxes 6.

In the example, plug-in brackets 54 as well as plug-in slots 56 are formed at each side wall 50, as can be seen in FIGS. 5 to 10. The plug-in brackets 54 are formed by bending over partial regions of the side wall 50. The plug-in slots 56 are cut out, for example, with a laser. In the example, the plug-in brackets 54 as well as the plug-in slots 56, when viewed in the direction of flow 18, are formed at the opposite edge sides of a respective side wall 50. In the example, precisely one plug-in bracket 54 and one plug-in slot 56 are formed at each edge side. In the Example, at mutually adjacent side walls 50, either plug-in brackets 54 or plug-in slots 56 are adjacent at the corners. In other words, this means that, when viewed in the direction of flow 18, as shown, for example, in FIG. 8, the plug-in brackets 54 as well as the plug-in slots 56 at opposite side walls 50 in each case are diagonally opposite to one another. By these means, a quasi upper side and a quasi underside, as well as a left and right side of the element box 6 are defined.

Mutually adjacent element boxes 6 are simply inserted into the stack frame 4 in an easy to assemble manner by stringing them together or placing them on top of one another. As a result, the plug-in brackets 54 engage in the plug-in slots 56, so that the element boxes 6 are connected positively with one another, the positive connection acting in the direction of flow 18. The individual element boxes 6 therefore form a plug-in system and can simply be inserted into one another. The element boxes 6 are securely fixed mechanically to one another by these plug-in connections, and are not fixed in any other way, especially not by welding.

At the end faces of the side walls 50, which end faces are opposite when viewed in the direction of flow 18, these end faces have a bent-over region 58. This serves for reinforcing the whole of the element box 6. The bent-over region 58 extends over the whole of the side length of a respective side wall 50. As can be inferred particularly from FIG. 9 or also from FIG. 5, this bent-over region 58 is formed as a bevel, which is oriented at an angle with respect to the direction of flow 18. The bent-over region 58 rises, for example, at an angle of 30° to 45° from the outside to the free interior space 8.

Additionally, a vertical section, which forms the plug-in bracket 54 and passes through the side wall 50, is also connected to the bent-over region 58. This situation can also be seen especially in FIG. 5

The catalyst module 2 is assembled preferably in the following way:

Initially, the side frame parts 20, 22, 24 are provided and, if necessary, assembled to form the hollow profiles. Subsequently, at first only the left side part 20, as well as the base part 22 are bolted together to form an L-shaped partial frame. Alternatively, a U-shaped partial frame may also be provided. The element boxes 6, equipped previously with the catalysts 10, are inserted successively in this L frame. They are held preferably exclusively by the holding brackets 40 to the stack frame 4 and to one another preferably exclusively by the plug-in connections. After the element boxes 6 are loaded, initially the right side part 20 is fastened to the L frame and, in so doing, the sealing element 30 is pressed between the outermost layer of the element boxes 6 and the right side part 20. The sealing element, especially a partial sealing element, is first fixed mechanically and especially by gluing here to the side part 20, before the side part 20 is then attached by bolting. The lid part 24 is then attached in the same way with compression of the sealing element 30. The sealing element 30 is thus pressed against the top layer of the element boxes 6 by bolting. Finally, at the end, the struts 28 are mounted. Therefore, by means of this manufacturing process, the individual element boxes 6 are clamped securely and reliably between the side frame parts 20, 22, 24. Since the sealing element 30 is clamped during the installation, it is compressed elastically over the whole surface thereof and clamped reliably.

As a result of the construction described here and the special method of assembling the catalyst module, especially the following advantages are achieved:
A complex pressing device or welding equipment is not required for filling the stack frame 4 with the element boxes 6. A leak-free sealing and assembly is made possible by inserting the sealing element 30.

Horizontal sealing in the transverse direction 14 is accomplished easily by the lid parts 24, which are bent in U-shaped fashion.

Because the welded connections of the element boxes 6 to one another and between the element boxes 6 and the stack frame 4 are omitted, appreciable time is saved during the assembly. This also leads to appreciable reductions in cost, especially because no welding or pressing equipment is required.

Furthermore, because of the modular concept, which is described here, with the bolted side frame parts 20, 22, 24, it is also possible to ship the catalyst module 2 in individual parts. The volume of goods to be transported can be reduced by these means. Safe transport is also made possible by these means, since the individual components can be packed securely.

The use of the element boxes 6, in particular also in combination with sealing elements 30, at the same time also provides a means which insulates the catalysts 10 against forces which are caused by temperature changes during heating up and contact with other parts of the catalyst module 2, or against vibrations or jolts which can occur during normal operation and act on the catalysts 10. The catalyst module 2 makes it possible to use catalysts 10 which are weaker in terms of their structure than those currently in use. At the same time, advantages such as reduced back-pressure, etc. are associated with this, since, on account of the insulating properties, the catalysts certainly do not have to have the strength exhibited by conventional catalysts.

Finally, there is also an improved flow guidance, especially because of the inclined, bent-over regions 58.

LIST OF REFERENCE SYMBOLS

2 catalyst module
4 stack frame
6 element box
8 free internal space
10 catalyst
12 longitudinal direction
14 transverse direction
16 end faces
18 direction of flow
20 side part
22 base part
24 lid part
26 bolted connection
28 struts
29 edge part
30 sealing element
32a U-shaped sheet metal part
32b flat sheet metal part
34 cover
36 loop
38 strip
40 holding bracket
42 slot
44 holding element
46 sealing web
50 side wall
52 sealing strip
54 plug-in bracket
56 plug-in slot
58 bent-over region

The invention claimed is:
1. A catalyst module for use in an emission control system of an industrial scale combustion system comprising:
- a stack frame, extending in a longitudinal direction and in a transverse direction and having two end surfaces, located opposite to one another in a direction of flow,
- a plurality of mounting units, each having side walls, forming a peripheral side wall, inserted in the stack frame,
- the stack frame comprising a peripheral wall, formed from side frame parts, connected to one another via at least one mechanical connecting element and
- a sealing element pressed between at least one of the side frame parts and at least one mounting unit,
- where the mounting units are constructed as element boxes, which form an n×m matrix and adjoin one another and each of the element boxes forms the boundary of a free interior space, which is provided with several catalysts, which adjoin one another,
- where the element boxes are held together positively by complementary plug-in connection elements, and
- where at least one plug-in connection element as well as one plug-in opening is formed at the side walls.

2. The catalyst module of claim 1, where the side frame parts have bent-over sheet-metal parts.

3. The catalyst module of claim 1, where the side frame parts are formed from two sheet-metal parts, each having a hollow profile, which are connected with one another.

4. The catalyst module of claim 1, where at least two of the side frame parts have holding brackets, between which a mounting unit is held.

5. The catalysts module of claim 1 where one of the side frame parts is constructed as a lid part and, externally, has at least one sealing web, which is disposed at the edge, wherein the sealing web is constructed for closing a parting plane between two adjacent catalyst modules in the installed state.

6. The catalyst module of claim 1, where one plug-in connection element and one plug-in opening is formed in each side wall at the edge in the direction of end faces.

7. The catalyst module of claim 1, where those element boxes, which are in contact with the stack frame, are held positively at the latter.

8. The catalyst module of claim 1, where the side walls consist of metal sheets, which, at the edge of at least one of two end faces, have a bent-over region, which is oriented at an angle to the direction of flow.

9. The catalyst module of claim 8, where the bent-over region adjoins a beveled vertical section, which is passed through the side wall and protrudes over the side wall.

10. A method for producing the catalyst module of claim 1, the method comprising:
- providing one of the mounting unit with the at least one catalyst,
- partially assembling the stack frame,
- inserting the mounting units in the stack frame, which has been only partly assembled,
- the sealing element is placed down and
- closing the stack frame using the mechanical connecting element and compressing the sealing element between the side frame part of the stack frame and at least one of the mounting units.

11. The method of claim 10, for which the stack frame initially is constructed L-shaped and, subsequently, the sealing element is placed in L-shaped fashion on an outer layer of the mounting units before the stack frame is closed with compression of the sealing element.

* * * * *